June 20, 1961  O. E. SMITH  2,988,847
BUCKING AND GALLOPING BRONCHO
Filed Sept. 16, 1957  2 Sheets-Sheet 1
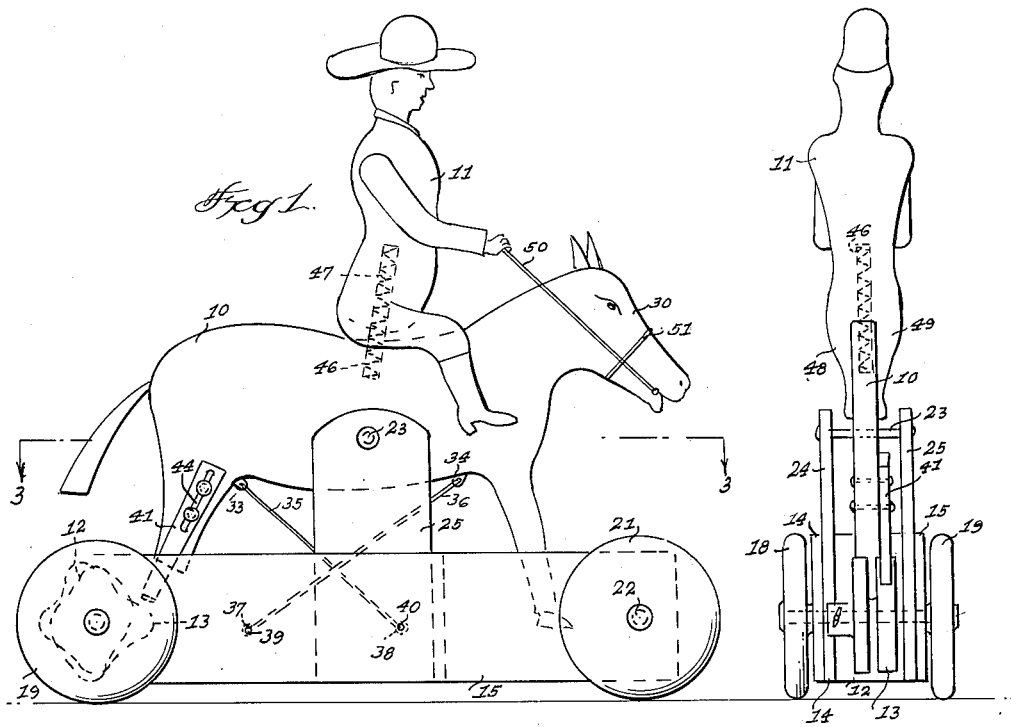
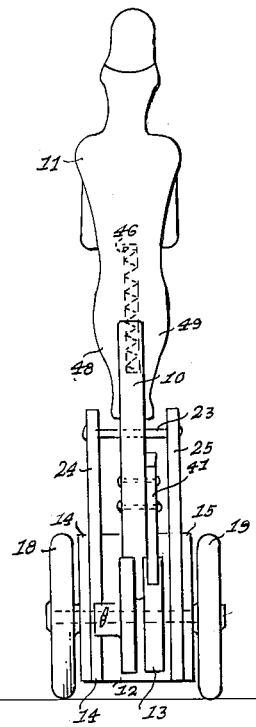
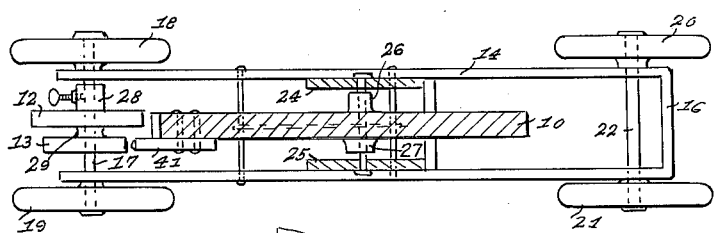
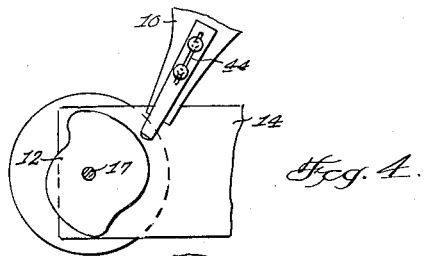
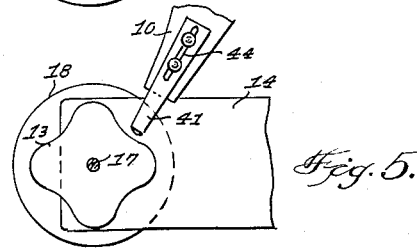
INVENTOR.
ORA E. SMITH
BY *Victor J. Evans & Co.*
ATTORNEYS

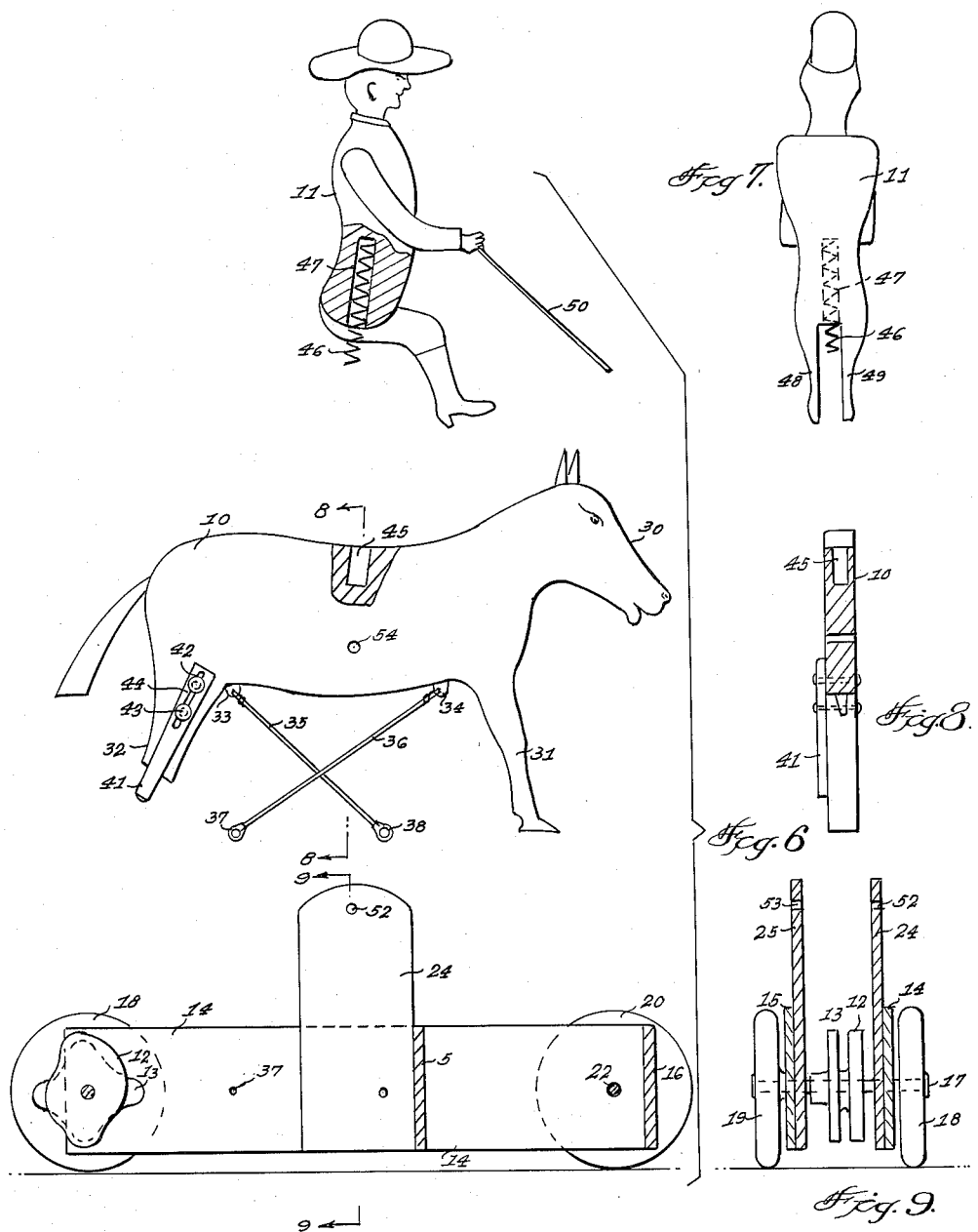

United States Patent Office 2,988,847
Patented June 20, 1961

2,988,847
BUCKING AND GALLOPING BRONCHO
Ora E. Smith, R.R. 1, Flechtner Heights, Fostoria, Ohio
Filed Sept. 16, 1957, Ser. No. 684,020
5 Claims. (Cl. 46—108)

This invention relates to toys of the type rolled over a table or floor, and in particular a horse having a rider freely positioned thereon with the horse pivotally mounted in uprights at the center of a chassis which is mounted on wheels and with the horse retained in position by elastic bands and actuated for bucking or galloping by individual cams.

The purpose of this invention is to provide an improved toy which holds the interest of children indefinitely.

Various types of toy horses and other animals have been mounted on wheels and actuated by eccentrically positioned parts, however, it has been found that by pivotally mounting the horse at the center of a carrier and actuating the horse by cams of different shapes the horse bucks and gallops as it is drawn over a surface.

The object of this invention is, therefore, to provide means for mounting and actuating the body of a toy horse so that the horse bucks and gallops as desired by the child.

Another object of the invention is to provide actuating means for a horse mounted on wheels whereby the horse may, selectively, pass through bucking actions with the parts in one position or gallop with the parts in another position.

Another important object of the invention is to provide a toy horse mounted on wheels and having a rider in which the rider is secured to the horse with relatively weak springs so that the rider assumes different positions to correspond with the bucking and galloping actions of the horse.

A further object of the invention is to provide a bucking and galloping toy horse which is of a simple and economical construction.

With these and other objects and advantages in view the invention embodies a chassis having elongated side bars connected at one end with a cross bar, wheels rotatably mounted on axles extended through the side bars, cams on the axle extended through ends of the side bars opposite to the ends connected with a cross bar, uprights extended from the side bars, a body simulating an animal pivotally mounted between the uprights, crossed rubber bands positioned with ends thereof connected to the body and also to the side bars on the chassis, a finger adjustably mounted on the body and positioned to engage the cams and the body of a rider positioned on the body of the horse.

Other features and advantages of the invention will appear from the following description taken in connection with the drawing, wherein:

FIGURE 1 is a side elevational view illustrating the improved toy horse showing the body of the horse in a horizontal position.

FIGURE 2 is an end elevational view looking toward the rear of the horse.

FIGURE 3 is a sectional plan taken on line 3—3 of FIGURE 1 illustrating the relative positions of the bucking and galloping cams.

FIGURE 4 is a view showing the bucking cam assembly with parts broken away and other parts omitted.

FIGURE 5 is a view illustrating the galloping cam assembly also with parts broken away and other parts omitted.

FIGURE 6 is an exploded view showing the individual parts of the improved bucking and galloping horse with parts of the body of the rider and horse broken away and also with the chassis or frame shown in section.

FIGURE 7 is a rear elevational view of the rider with other parts omitted.

FIGURE 8 is a cross section through the body of the horse taken on line 8—8 of FIGURE 6.

FIGURE 9 is a cross section through the chassis or frame taken on line 9—9 of FIGURE 6.

Referring now to the drawing wherein like reference characters denote corresponding parts the improved bucking and galloping horse of this invention includes a body 10 representing an animal, a body 11 representing a rider, a bucking cam 12, a galloping cam 13 and a chassis having side bars 14 and 15, a cross bar 16 at the front, an axle 17 at the rear and on which the cams 12 and 13 are mounted, wheels 18 and 19 positioned on ends of the rear axle and wheels 20 and 21 positioned on the ends of a front axle 22.

The body of the horse is pivotally mounted by a shaft 23 in the upper ends of uprights 24 and 25 and the uprights are secured on the side bars 14 and 15, by welding, or the like.

The body 10 is provided with hubs 26 and 27 through which the shaft 23 extends, the hubs spacing the body of the horse in the center of the toy.

The cams 12 and 13 are slidably mounted on the axle 17 and, as shown in FIGURE 3 the cams are retained in adjusted positions by set collar 28 that is provided with a sleeve 29 that extends through the cams.

The body 10 is provided with a head 30, fore legs 31 and hind legs 32 and the under surface is provided with eyes 33 and 34 from which elastic members or rubber bands 35 and 36 extend and, as shown in FIGURE 1 the lower ends of the rubber bands are provided with eyes 37 and 38 that are secured on pins 39 and 40 so that the rubber bands 35 and 36 are arranged in crossed relation to each other.

The hind legs are also provided with a finger 41 that is adjustably mounted by screws 42 and 43 which are positioned in a slot 44 whereby adjustment is provided to regulate the kicking or bucking action of the horse. With the rubber bands 35 and 36 connected to the body 10 of the horse and to the chassis on opposite sides of the shaft 23, the rubber bands 35 and 36 are alternately tensioned and untensioned by the alternate engagement of the finger 41 with the cams 12 and 13. Thus as the cams 12 and 13 elevate the rear portion of the body 10 of the horse by reason of their engagement with the finger 41, the rubber band 35 will be tensioned and when the finger 41 becomes disengaged from the cams 12 and 13, the tensioned rubber band 35 will snap back to untensioned position causing the front portion of the horse 10 of the horse to be raised suddenly. Therefore, the tensioning and untensioning of the rubber bands 35 and 36 will cause the rear portion of the body 10 of the horse to be lowered suddenly and the front portion of the body 10 of the horse to be raised suddenly creating a kicking effect of the body 10.

The back of the horse is provided with a socket 45 that is positioned to receive the lower end of a spring 46 that extends upwardly into a bore 47 in the body 11. By this means the body is free to sway with movement of the body of the horse and, at the same time, the body is retained in position by the legs 48 and 49 in combination with the reins 50 which extend from the halter 51.

The frame is also provided with an intermediate cross bar 5 and the shaft 23 by which the body of the horse is pivotally mounted in the toy is positioned in openings 52 and 53 in the upper ends of the uprights and also through an opening 54 in the body of the horse.

With the parts assembled as illustrated and described the cam 12 is set in the path of the finger 41 when it is desired to simulate a bucking broncho action and when it is desired to provide a galloping action the cam 13 is positioned in the path of the finger. The device may, therefore, be adjusted to simulate either a bucking or galloping action.

It will be understood that modifications, within the scope of the appended claims, may be made in the design and arrangement of the parts without departing from the spirit of the invention.

What is claimed is:

1. A chassis mounted on wheels, a body of an animal pivotally mounted on the chassis, crossed elastic elements connected to the body of the animal and chassis on opposite sides of the pivotal mounting of the body on the chassis, a rider freely mounted on the body of the animal, cam means actuated by the wheels at one end of the chassis, means mounted on said body for engagement with said cam means to tension or untension said crossed elastic elements for imparting action to the body of the animal, and the tensioning and untensioning of said crossed elastic elements causing the rear portion of the body to lower suddenly and the front portion of the body to rise suddenly to create a kicking effect to the body.

2. A toy horse comprising an elongated frame having side bars connected by cross bars, a front axle rotatably mounted in the forward end of the frame, wheels on the ends of the front axle, a rear axle rotatably mounted in the opposite end of the frame, wheels mounted on ends of the rear axle, a body of an animal positioned above the frame, a cam patterned to provide action to the body mounted on the axle at the rear of the frame, means pivotally mounting the body of the animal on the frame, a finger having a longitudinally extending slot therein, means connected to said body and engaging the slot in said finger for adjustably mounting the finger on the body of the animal and said finger being positioned to alternately engage the cam, crossed elastic elements connected to the body of the animal and frame on opposite sides of the pivotal mounting of the body on the frame, and a rider positioned on the body of the animal, and the alternate engagement of said finger with said cam causing the tensioning and untensioning of said elastic elements to cause the rear portion of the body to lower suddenly and the front portion of the body to rise suddenly to create a kicking effect to the body.

3. In a toy horse, the combination which comprises a frame having side bars connected with cross bars, a front axle rotatably mounted in the forward end of the frame, wheels mounted on extended ends of the front axle, a rear axle rotatably mounted in the rear end of the frame, wheels mounted on ends of the rear axle, a horse pivotally mounted on the frame, a rider freely mounted on the horse, elastic members connecting the horse to the frame, a cam adjustably mounted on the rear axle, and a finger having a longitudinally extending slot therein, means connected to said body and engaging the slot in said finger for adjustably mounting the finger on the horse and said finger being positioned to alternately engage the cam, the cam being adjustable longitudinally on the rear axle, and the alternate engagement of said finger with said cam causing the tensioning and untensioning of said elastic members to cause the rear portion of the body to lower suddenly and the front portion of the body to rise suddenly to create a kicking effect to the body.

4. In a toy horse, the combination which comprises a chassis, spaced parallel elongated bars, cross bars connecting the elongated bars, a front axle rotatably mounted in the forward ends of the elongated bars, wheels on ends of the front axle, a rear axle rotatably mounted in rear ends of the elongated bars, wheels on ends of the rear axle, uprights extended upwardly from intermediate parts of the elongated bars, the body of a horse pivotally mounted in upper ends of the uprights, a rider freely mounted on the body of the horse, a cam designed to produce action of the horse slidably mounted on the rear axle, a finger having a longitudinally extending slot therein, means connected to said body and engaging the slot in said finger for adjustably mounting the finger on the horse and extended for alternate engagement with said cam, and means for adjusting the cam longitudinally of the rear axle whereby the cam designed to produce action is positioned to engage the finger, crossed elastic members connected to the body of the horse and chassis on opposite sides of the pivotal mounting of the body on said chassis and said elastic elements are adapted to be tensioned and untensioned by the alternate engagement of said finger with said cam whereby the front portion of said body is raised suddenly and the rear portion of said body is lowered suddenly to create a kicking effect of the body.

5. In a toy horse, the combination which comprises a chassis, spaced parallel elongated bars, cross bars connecting the elongated bars, a front axle rotatably mounted in the forward ends of the elongated bars, wheels on ends of the front axle, a rear axle rotatably mounted in rear ends of the elongated bars, wheels on ends of the rear axle, uprights extended upwardly from intermediate parts of the elongated bars, the body of a horse pivotally mounted in upper ends of the uprights, a rider freely mounted on the body of the horse, a cam designed to produce action of the horse slidably mounted on the rear axle, a finger having a longitudinally extending slot therein, means connected to said body and engaging the slot in said finger for adjustably mounting the finger on the horse and extended for alternate engagement with said cam, means for adjusting the cam longitudinally of the rear axle whereby the cam is designed to produce action, crossed elastic members connected to the body of the horse and chassis on opposite sides of the pivotal mounting of the body on said chassis and said elastic elements are adapted to be tensioned and untensioned by the alternate engagement of said finger with said cam whereby the front portion of said body is raised suddenly and the rear portion of said body is lowered suddenly to create a kicking effect of the body.

References Cited in the file of this patent

UNITED STATES PATENTS

| 217,975 | Barnes | July 29, 1879 |
| 1,285,047 | Coleman | Nov. 19, 1918 |
| 1,604,206 | Tilton | Oct. 26, 1926 |
| 1,622,473 | Stier | Mar. 29, 1927 |
| 2,398,024 | Martin et al. | Apr. 9, 1946 |
| 2,772,513 | Hagen | Dec. 4, 1956 |